(12) United States Patent
Maier et al.

(10) Patent No.: US 10,735,738 B2
(45) Date of Patent: Aug. 4, 2020

(54) REFINEMENT OF A LOW-PEL RESOLUTION MOTION ESTIMATION VECTOR

(71) Applicant: Fraunhofer-Gesellschaft zur Foerderung der angewandten Forschung e.V., Munich (DE)

(72) Inventors: Georg Maier, Karlsruhe (DE); Benjamin Bross, Berlin (DE); Dan Grois, Beer-Sheva (IL); Detlev Marpe, Berlin (DE); Heiko Schwarz, Panketal (DE); Thomas Wiegand, Berlin (DE); Remco C. Veltkamp, WS Houten (NL)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 100 days.

(21) Appl. No.: 15/852,605

(22) Filed: Dec. 22, 2017

(65) Prior Publication Data

US 2018/0139451 A1 May 17, 2018

Related U.S. Application Data

(63) Continuation of application No. PCT/EP2015/064458, filed on Jun. 25, 2015.

(51) Int. Cl.
*H04N 19/147* (2014.01)
*H04N 19/523* (2014.01)
(Continued)

(52) U.S. Cl.
CPC ......... *H04N 19/147* (2014.11); *H04N 19/139* (2014.11); *H04N 19/17* (2014.11);
(Continued)

(58) Field of Classification Search
CPC .... H04N 19/147; H04N 19/17; H04N 19/139; H04N 19/567; H04N 19/176;
(Continued)

(56) References Cited

U.S. PATENT DOCUMENTS

| | | | | |
|---|---|---|---|---|
| 7,463,782 B2* | 12/2008 | Fuchs | ................... | G06T 9/008 |
| | | | | 375/E7.142 |
| 8,351,509 B1* | 1/2013 | Hurd | ................... | H04N 19/56 |
| | | | | 375/240.16 |

(Continued)

OTHER PUBLICATIONS

Bjontegaard, Gisle et al., "Calculation of average PSNR differences between RD-Curves", Proceedings of the ITU-T Video Coding Experts Group (VCEG) Thirteenth Meeting, Austin, Texas, USA, Apr. 2-4, 2001, pp. 1-4.

(Continued)

*Primary Examiner* — James M Pontius
(74) *Attorney, Agent, or Firm* — Michael A. Glenn; Perkins Coie LLP

(57) ABSTRACT

The refinement of a lower-pel resolution motion estimation vector is made more effective by preceding the actual refinement with a determination of a context out of a set of context candidates based on coding costs of a set of lower-pel resolution vectors within a neighborhood of the lower-pel resolution motion estimation vector, wherein each context candidate is associated with a ranking among a set of higher-pel resolution candidate vectors surrounding the lower-pel resolution motion estimation vector. The actual refinement of the lower-pel resolution motion estimation vector to obtain the higher-pel resolution motion estimation vector may thus use the ranking associated with the context determined: sequentially arranged accordingly, the set of higher-pel resolution candidate vectors may be tested sequentially.

17 Claims, 7 Drawing Sheets

(51) Int. Cl.
| | |
|---|---|
| *H04N 19/567* | (2014.01) |
| *H04N 19/176* | (2014.01) |
| *H04N 19/533* | (2014.01) |
| *H04N 19/557* | (2014.01) |
| *H04N 19/139* | (2014.01) |
| *H04N 19/17* | (2014.01) |
| *H04N 19/132* | (2014.01) |

(52) U.S. Cl.
CPC ......... *H04N 19/176* (2014.11); *H04N 19/523* (2014.11); *H04N 19/533* (2014.11); *H04N 19/557* (2014.11); *H04N 19/567* (2014.11); *H04N 19/132* (2014.11)

(58) Field of Classification Search
CPC .. H04N 19/523; H04N 19/533; H04N 19/557; H04N 19/132
See application file for complete search history.

(56) References Cited

U.S. PATENT DOCUMENTS

| | | | | |
|---|---|---|---|---|
| 10,097,821 | B2* | 10/2018 | Gu | H04N 19/139 |
| 2002/0025001 | A1* | 2/2002 | Ismaeil | H04N 19/56 375/240.16 |
| 2003/0138150 | A1* | 7/2003 | Srinivasan | H04N 19/523 382/238 |
| 2005/0286777 | A1* | 12/2005 | Kumar | H04N 19/00 382/232 |
| 2007/0217515 | A1* | 9/2007 | Wang | H04N 19/51 375/240.17 |
| 2008/0126278 | A1* | 5/2008 | Bronstein | H04N 19/176 706/17 |
| 2012/0207220 | A1* | 8/2012 | Kim | H04N 19/46 375/240.16 |
| 2013/0070846 | A1* | 3/2013 | Lim | H04N 19/523 375/240.03 |
| 2015/0264390 | A1* | 9/2015 | Laroche | H04N 19/176 375/240.16 |
| 2016/0112704 | A1* | 4/2016 | Grange | H04N 19/597 375/240.12 |
| 2016/0127741 | A1* | 5/2016 | Possos | H04N 19/182 375/240.16 |
| 2017/0094311 | A1* | 3/2017 | Chou | H04N 19/53 |
| 2017/0142438 | A1* | 5/2017 | Hepper | H04N 19/117 |

OTHER PUBLICATIONS

Bossen, Frank, "Common test conditions and software reference configurations", Joint Collaborative Team on Video Coding (JCT-VC) of ITU-T and ISO, 12th Meeting: Geneva, CH Jan. 14-23, 2013, pp. 1-4.
Bossen, Frank et al., "HEVC Complexity and Implementation Analysis", IEEE Transactions on Circuits and Systems for Video Technology, vol. 22, No. 12, Dec. 2012, pp. 1685-1696.
Bross, Benjamin et al., "HEVC Performance and Complexity for 4K Video", 2013 IEEE Third International Conference on Consumer Electronics—Berlin (ICCE-Berlin); Sep. 9-11, 2013, pp. 44-47.
Bross, Benjamin et al., "The New High-Efficiency Video Coding Standard", SMPTE Motion Imaging Journal 122.4; May/Jun. 2013, pp. 25-35.
Choudhury, Hussain A. et al., "Survey on Block Matching Algorithms for Motion Estimation", IEEE International Conference on Communication and Signal Processing, Apr. 3-5, 2014, India, pp. 036-040.
Grois, Dan et al., "Comparative Assessment of H.265/MPEG-HEVC, VP9, and H.264/MPEG-AVC Encoders for Low-Delay Video Applications", SPIE Proceedings, vol. 9217, Applications of Digital Image Processing XXXVII, Sep. 23, 2014, 10 pages.
Grois, Dan et al., "Performance Comparison of H.265/MPEG-HEVC, VP9, and H.264/MPEG-AVC Encoders", IEEE 30th Picture Coding Symposium 2013 (PCS 2013), San José, CA, USA, Dec. 8-11, 2013, pp. 1-4.
Helle, Philipp et al., "Block Merging for Quadtree-Based Partitioning in HEVC", IEEE Transactions on Circuits and Systems for Video Technology, vol. 22, No. 12, Dec. 2012, pp. 1720-1731.
Li, Huang et al., "An Optimally Scalable and Cost-Effective Fractional-Pixel Motion Estimation Algorithm for HEVC", 2013 IEEE International Conference on Acoustics, Speech and Signal Processing (ICASSP), Vancouver, B.C., May 26-31, 2013, pp. 1399-1403.
Lin, Weiyao et al., "A Fast Sub-Pixel Motion Estimation Algorithm for H.264/AVC Video Coding", IEEE Transactions on Circuits and Systems for Video Technology, vol. 21, No. 2, Feb. 2011, pp. 237-242.
Lu, Jiyuan et al., "On Combining Fractional-Pixel Interpolation and Motion Estimation: A Cost-Effective Approach", IEEE Transactions on Circuits and Systems for Video Technology vol. 21(6), Jun. 2011, pp. 717-728.
Marpe, Detlev et al., "Context-Based Adaptive Binary Arithmetic Coding in the H.264/AVC Video Compression Standard", IEEE Transactions on Circuits and Systems for Video Technology, vol. 13, No. 7, Jul. 2003, pp. 620-636.
Marpe, Detlev et al., "Video Compression Using Nested Quadtree Structures, Leaf Merging, and Improved Techniques for Motion Representation and Entropy Coding", IEEE Transactions on Circuits and Systems for Video Technology, vol. 20, No. 12, Dec. 2010, pp. 1676-1687.
Nisar, Humaira et al., "Fast and Efficient Fractional Pixel Motion Estimation for H.264/AVC Video Coding", 16th IEEE International Conference on Image Processing (ICIP), Nov. 7-10, 2009, pp. 1561-1564.
Ohm, Jens-Rainer et al., "Comparison of the Coding Efficiency of Video Coding Standards—Including High Efficiency Video Coding (HEVC)", IEEE Transactions on Circuits and Systems for Video Technology, vol. 22, No. 12, Dec. 2012, pp. 1669-1684.
Sotetsumoto, Tsuyoshi et al., "Low Complexity Algorithm for Sub-Pixel Motion Estimation of HEVC", 2013 IEEE International Conference on Signal Processing, Communication and Computing (ICSPCC), Aug. 5-8, 2013, 4 pages.
Suh, Jung W. et al., "Fast Sub-pixel Motion Estimation Techniques Having Lower Computational Complexity", IEEE Transactions on Consumer Electronics, vol. 50, No. 3, Aug. 2004, pp. 968-973.
Sullivan, Gary J. et al., "Overview of the High Efficiency Video Coding (HEVC) Standard", IEEE Transactions on Circuits and Systems for Video Technology, vol. 22, No. 12, Dec. 2012, pp. 1649-1668.
Sullivan, Gary J. et al., "Rate-Distortion Optimization for Video Compression", Signal Processing Magazine, IEEE, vol. 15:6, Nov. 1998, pp. 74-90.
Wei, Zhang et al., "Directionality based fast fractional pel motion estimation for H.264", Journal of Systems Engineering and Electronics vol. 20, No. 3, Jun. 2009, pp. 457-462.
Zhang, Ying et al., "Fast sub-pixel motion estimation based on directional information and adaptive block classification", 5th International Conference on Visual Information Engineering, Jul. 29-Aug. 1, 2008, pp. 622-627.

* cited by examiner

| C# | ranking ({1,2,3,4,6,7,8,9}) | bestMv = 1 | | bestMv = 2 | | bestMv = 9 |
|---|---|---|---|---|---|---|
| | | ranking ({A,B,C,D,E,F,G,H}) | | ranking ({C,E,H,I,J,K,L,M}) | ... | ranking ... |
| 1 | 9, 7, 3 ... | A, B, D ... | | | | |
| 2 | ... | ... | | | ... | |
| ... | | | | | | |
| N | | ... | | ... | | ... |

FIG 3

| $\vec{x}_1$ | $\vec{x}_2$ | $\vec{x}_3$ |
|---|---|---|
| $\vec{x}_4$ | $\vec{x}_5$ | $\vec{x}_6$ |
| $\vec{x}_7$ | $\vec{x}_8$ | $\vec{x}_9$ |

REFINEMENT OF A LOW-PEL RESOLUTION MOTION ESTIMATION VECTOR

CROSS-REFERENCES TO RELATED APPLICATIONS

This application is a continuation of copending International Application No. PCT/EP2015/064458, filed Jun. 26, 2015, which is incorporated herein by reference in its entirety.

The present application is concerned with a concept for refining a low-pel resolution motion estimation vector for use, for example, in a video encoder supporting motion-compensated prediction at sub-pel resolution.

BACKGROUND OF THE INVENTION

The H.265/MPEG-H High Efficiency Video Coding (HEVC) standard allows dramatic bit-rate savings of about 50% for essentially the same subjective quality when compared to its predecessor H.264/MPEG-4 Advanced Video Coding (AVC) standard. Thereby, it efficiently tackles challenges posed on modern communication networks and storage media resulting from the dramatically increasing video bandwidth demands. The H.265/MPEG-H HEVC standard was designed to be applicable for almost all existing H.264/MPEG-4 AVC applications, while making a special emphasis on the High Definition (HD) and Ultra High-Definition (UHD) video content, since need for these formats is expected to increase significantly during the next years. However, the above-mentioned coding performance gain comes at the cost of tremendously increased computational complexity, mainly due to supporting a relatively large number of coding modes [1], [2].

During the HEVC encoding process, in addition to determining the quadtree block partitioning [3], [4], the mode decision process enables to determine whether a coding unit (CU) should be encoded by using intra- or inter-picture prediction techniques, thereby exploiting spatial or temporal redundancies, respectively. The decision process is commonly implemented by means of a rate-distortion optimization (RDO) technique. A cost function, as shown in Equation (1), has to be minimized, whereas the overall cost J is based on the bit rate cost R and on the distortion cost D, which are weighted by using a Lagrange multiplier $\lambda$ [5]. Therefore, in order to determine the best coding mode, the CU is usually encoded in a plurality of coding modes, which leads to a high computational burden at the encoder end.

$$J = D + \lambda R \quad (1)$$

Inter-picture prediction plays a crucial role in modern video coding applications due to its high potential to significantly improve coding efficiency. Temporal redundancy is removed by encoding a block in terms of a displacement to one or more reference blocks, which are located in prior encoded reference frames. The displacement information is encoded as a so-called motion vector (MV), which is identified by executing the motion estimation (ME) process. Generally, in recent video encoders, the ME process is usually regarded as a 3-step process, including the motion vector prediction (MVP), integer-pel accuracy search, and sub-pel refinement. Regarding the latter, similarly to H.264/MPEG-4 AVC, the HEVC standard allows to address the motion information on a quarter-pel precision level. Such sub-sample positions may be obtained by applying computationally costly interpolation methods, which are followed by a search around the position of the prior-determined integer-pel MV. However, the implementation of such methods is very challenging for real-time encoders, which may be useful to meet a predefined ultra low processing latency.

A comprehensive overview of the HEVC standard is provided in [6], and a detailed analysis of the coding efficiency can be found in [7]. In addition, a comparison to other recent video coding schemes is presented in [8] with a particular focus on low delay applications in [9]. Also, additional studies with regard to the HEVC decoding performance and complexity are shown in [10], while making a special emphasis on 4K resolution videos (i.e. the 3840×2160 resolution in terms of luma samples).

Further, with regard to video coding standards that employ inter-picture prediction, intensive research has been conducted for carrying out sub-optimal strategies in the field of integer-pel accuracy ME, thereby targeting an optimal trade-off between computational complexity and coding efficiency. Most of the proposed algorithms sub-sample a search space, while trying to avoid the risk of getting trapped in a local minimum, which does not correspond to the global minimum for a given cost function. A recent survey on fast block matching algorithms can be further found in [11].

In the following, several traditional search techniques regarding sub-pel ME are discussed: first, the conventional interpolation-and-search method is described, followed by a discussion of recent pattern-based approaches, and finally several error surface approximation techniques are outlined.

The traditional so called interpolation-and-search method for sub-pel refinement is presented in FIG. 8a,b. It relies on the common assumption that an optimal sub-pel position is located adjacent to the optimal full-pel position, which in turn gives rise to 48 possible quarter-pel positions. However, the corresponding search is typically divided in two steps as follows. First, the interpolation and search is performed on a half-pel accuracy level, as depicted in FIG. 8a. Second, this procedure is repeated on a quarter-pel accuracy level, while reducing the search space to the neighborhood of the previously selected half-pel position, as further shown in FIG. 8b. Consequently, this approach is limited to 8 half-pel positions and 8 quarter-pel positions. Also, if no better sub-pel position can be determined, the MV stays on a full-pel position.

In the light of the popularity of approaches that have been developed for integer-pel search, various pattern-based strategies have also been developed with regard to sub-pel refinement. However, while adopting the assumption that the optimal sub-pel position is adjacent to the selected integer-pel position, it is important to note that the search space has rather a limited size. Additional attempts have been made to sub-sample this search space by first trying to predict a restricted search space, and then to conduct a search within the predicted sub-pel space, which appears to be limited by definition. For example, in [12], the authors propose to reduce the number of search points (from 8 points to only 6) both for half-pel and quarter-pel search by first checking only 4 "near-located" samples, and subsequently 2 "far-located" samples, which in turn are positioned next to the best "near-located" sample. It should be noted that the authors of [12] treat the samples, which are adjacently located in horizontal and vertical directions, as "near-located" samples and those adjacently located in the diagonal directions as "far-located" samples. As a result, this approach clearly favors the "near-located" samples over the "far-located" samples by providing them a larger weight during the decision process. Another example is shown in [13], where the authors propose to limit the search to one quadrant. The corresponding quadrant is determined by checking 2 fixed samples. In addition, in [14], the search space is restricted to only a few points depending on the direction of the integer-pel accuracy MV. Further, in [15], a pattern application being dependent on the distortion distribution of surrounding full-pel positions is proposed.

Another type of techniques related to sub-pel refinement attempts to approximate the error surface on a sub-pel level around the selected integer-pel position. In [16], the authors propose three mathematical models for determining a sub-pel accuracy motion vector. This approach may use the computation of 9 integer-pel position errors, some of which can be already known (depending on the applied integer-pel search algorithm), while omitting the interpolation and search on a sub-pel level. While the authors present results at a half-pel accuracy level, it is obvious that this approach can easily be extended to quarter-pel accuracy. In addition, in [17], those models are applied by considering the obtained coding costs for the integer-pel positions that may be used rather than the distortions values. According to this approach, an early termination criteria is also applied based on the shape of the resulting surface, whenever no significant improvement through the sub-pel refinement is expected.

SUMMARY

According to an embodiment, an apparatus for refinement of a lower-pel resolution motion estimation vector may have: a higher-pel resolution vector ranker configured to determine a context out of a set of context candidates based on coding costs of a set of lower-pel resolution vectors within a neighborhood of the lower-pel resolution motion estimation vector, each context candidate being associated with a ranking among a set of higher-pel resolution candidate vectors surrounding the lower-pel resolution motion estimation vector; and refiner configured to refine the lower-pel resolution motion estimation vector so as to obtain a higher-pel resolution motion estimation vector by performing a sequential—according to the ranking associated with the context determined—testing of the set of higher-pel resolution candidate vectors whether a current higher-pel resolution candidate vector has a lower coding cost associated therewith than a coding cost of the lower-pel resolution motion estimation vector and a coding cost of any preceding higher-pel resolution candidate vector, selecting the current higher-pel resolution candidate vector as the higher-pel resolution motion estimation vector if the current higher-pel resolution candidate vector has a lower coding cost associated therewith than a coding cost of the lower-pel resolution motion estimation vector and a coding cost of any preceding higher-pel resolution candidate vector; and aborting the sequential testing according to a predetermined abort criterion.

Another embodiment may have a video encoder supporting motion-estimated prediction including an apparatus for refinement of a lower-pel resolution motion estimation vector as mentioned above.

According to another embodiment, a method for refinement of a lower-pel resolution motion estimation vector may have the steps of: determining a context out of a set of context candidates based on coding costs of a set of lower-pel resolution vectors covering a neighborhood of the lower-pel resolution motion estimation vector, each context candidate being associated with a ranking among a set of higher-pel resolution candidate vectors surrounding the lower-pel resolution motion estimation vector; and refining the lower-pel resolution motion estimation vector so as to obtain a higher-pel resolution motion estimation vector by performing a sequential—according to the ranking of the context determined—testing of the set of higher-pel resolution candidate vectors whether a current higher-pel resolution candidate vector has a lower coding cost associated therewith than a coding cost of the lower-pel resolution motion estimation vector and a coding cost of any preceding higher-pel resolution candidate vector, selecting the current higher-pel resolution candidate vector as the higher-pel resolution motion estimation vector if the current higher-pel resolution candidate vector has a lower coding cost associated therewith than a coding cost of the lower-pel resolution motion estimation vector and a coding cost of any preceding higher-pel resolution candidate vector; and aborting the sequential testing according to a predetermined abort criterion.

According to another embodiment, a non-transitory digital storage medium may have a computer program stored thereon to perform the method for refinement of a lower-pel resolution motion estimation vector, including determining a context out of a set of context candidates based on coding costs of a set of lower-pel resolution vectors covering a neighborhood of the lower-pel resolution motion estimation vector, each context candidate being associated with a ranking among a set of higher-pel resolution candidate vectors surrounding the lower-pel resolution motion estimation vector; and refining the lower-pel resolution motion estimation vector so as to obtain a higher-pel resolution motion estimation vector by performing a sequential—according to the ranking of the context determined—testing of the set of higher-pel resolution candidate vectors whether a current higher-pel resolution candidate vector has a lower coding cost associated therewith than a coding cost of the lower-pel resolution motion estimation vector and a coding cost of any preceding higher-pel resolution candidate vector, selecting the current higher-pel resolution candidate vector as the higher-pel resolution motion estimation vector if the current higher-pel resolution candidate vector has a lower coding cost associated therewith than a coding cost of the lower-pel resolution motion estimation vector and a coding cost of any preceding higher-pel resolution candidate vector; and aborting the sequential testing according to a predetermined abort criterion, when said computer program is run by a computer.

The refinement of a lower-pel resolution motion estimation vector is made more effective by preceding the actual refinement with a determination of a context out of a set of context candidates based on coding costs of a set of lower-pel resolution vectors within a neighborhood of the lower-pel resolution motion estimation vector, wherein each context candidate is associated with a ranking among a set of higher-pel resolution candidate vectors surrounding the lower-pel resolution motion estimation vector. The actual refinement of the lower-pel resolution motion estimation vector to obtain the higher-pel resolution motion estimation vector may thus use the ranking associated with the context determined: sequentially arranged accordingly, the set of higher-pel resolution candidate vectors may be tested sequentially. A current, i.e. currently tested, high-pel resolution candidate vector is tested whether same has a lower coding cost associated therewith than a coding cost of the lower-pel resolution motion vector and a coding cost of any preceding, i.e. previously tested, higher-pel resolution candidate vector (preceding in accordance with the ranking associated with the context determined). If the current higher-pel resolution candidate vector has a lower coding cost associated therewith, then the current higher-pel resolution candidate vector may be selected as the higher-pel resolution motion estimation vector. The sequential testing may be aborted according to a predetermined abort criterion. Experimental tests revealed that the computational complexity of the refinement is reduced at merely marginal coding cost penalties compared to brute force testing of all higher-pel resolution candidate vectors surrounding the lower-pel resolution motion estimation vector.

BRIEF DESCRIPTION OF THE DRAWINGS

Embodiments of the present invention will be detailed subsequently referring to the appended drawings, in which:

FIG. 3 shows schematically a construction of a look-up table for the rankings associated with the individual contexts in accordance with an embodiment according to which a refinement towards the resolution of the even-higher-pel resolution vectors is performed in two stages;

DETAILED DESCRIPTION OF THE INVENTION

Figure 1:
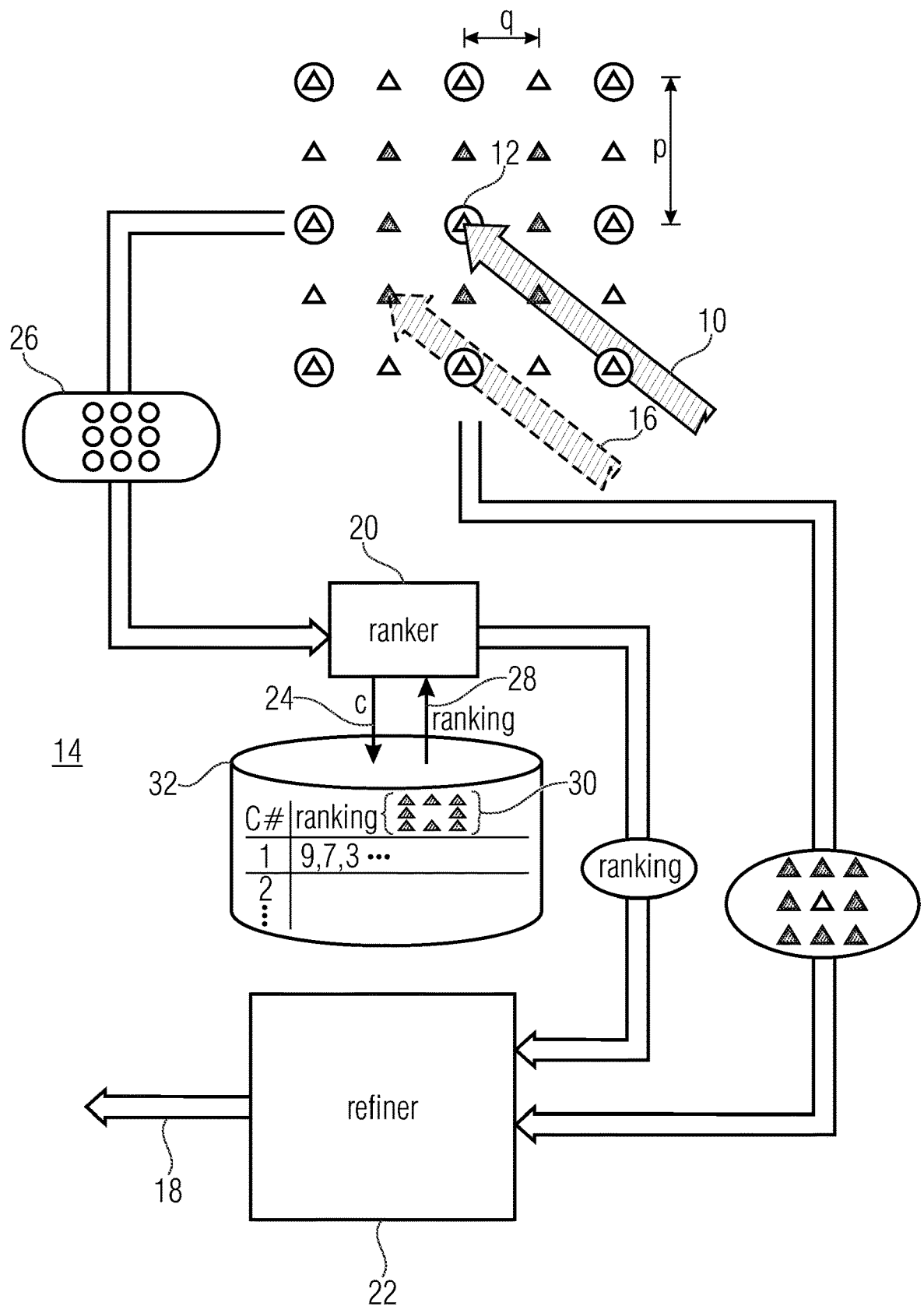
FIG. 1 shows a schematic diagram of an apparatus for refining a low-pel resolution motion estimation vector in accordance with an embodiment.

FIG. 1 shows an apparatus for refining a lower-pel resolution motion estimation vector in accordance with an embodiment. FIG. 1 illustrates a lower-pel resolution motion estimation vector 10 to be refined. As described in the introductory portion of the specification of the present application, this lower-pel resolution motion estimation vector describes, in lower-pel resolution, an estimated motion between a reference picture and a current picture. This lower-pel resolution motion estimation vector may have been obtained by any suitable technique, such as, for example, brute force testing. That is, the lower-pel resolution motion estimation vector represents a lower-pel resolution motion vector which, in accordance with a predetermined coding cost function, leads to a minimal or almost minimal coding cost. That is, when using the lower-pel resolution motion estimation vector 10 for motion-compensated prediction, the coding cost is minimal, or almost minimal, compared to other lower-pel resolution motion estimation vectors. The coding cost function may, as described in the introductory portion of the specification of the present application, be a function of coding rate, i.e. the coding rate resulting when encoding a current coding block of a current picture using motion-compensated prediction using the respective motion estimation vector, and distortion, i.e. the distortion resulting when coding the respective coding block using motion-compensated prediction using the respective motion estimation vector.

FIG. 1 illustrates the lower-pel resolution motion estimation vector 10 to be refined as pointing, for example, from a lower-pel position (not shown in FIG. 1) such as (0,0) for example, to lower-pel position 12. This lower-pel position 12 is one of a grid of lower-pel positions, all of which are illustrated in FIG. 1 using circles. The lower-pel positions are illustrated in FIG. 1 as being arranged in rows and columns, but any other grid constellation could also apply.

The apparatus of FIG. 1 is generally indicated using reference sign 14. The apparatus is to refine the lower-pel resolution motion estimation vector 10 so as to obtain a higher-pel resolution motion estimation vector such as, for example, 16. The aim of the refinement is the following: as described previously, the lower-pel resolution motion estimation vector 10 has already been selected according to some optimization aim, i.e. so as to minimize a certain cost function. However, the selection of the lower-pel resolution motion estimation vector had been restricted to lower-pel resolution vectors only. According to the refinement by apparatus 14, the accuracy of representing the motion estimation vector is improved. That is, the apparatus 14 seeks to improve the coding cost by selecting the motion estimation vector out of higher-pel resolution positions, i.e. a grid of positions having a smaller pitch compared to the pitch of the lower-pel resolution positions. In FIG. 1, the higher-pel resolution positions are illustrated using triangles. In accordance with the example illustrated in FIG. 1, the higher-pel resolution positions correspond to a positional pitch of half the positional pitch of the lower-pel resolution positions so that one quarter of the higher-pel resolution positions actually coincide with the lower-pel resolution positions while three quarters thereof are arranged in the middle between neighboring lower-pel resolution positions. That is, the higher-pel resolution positions are also arranged in rows and columns, however, with the row pitch and column pitch being half when compared to the corresponding row and column pitch of the lower-pel resolution grid. Owing to the higher resolution of representing the motion estimation vector, and accordingly the higher number of available higher-pel resolution candidate vectors for representing the estimated motion between a current picture and a reference picture, the apparatus 14 is likely to be able to find a higher-pel resolution motion estimation vector which leads to a lower coding cost than compared to the lower-pel resolution motion estimation vector 10 fed to apparatus 14 to be refined. In case of the higher-pel resolution position grid partially coinciding with the lower-pel resolution position grid as depicted in the example of FIG. 1, it may naturally occur that the higher-pel resolution motion estimation vector finally output by apparatus 14 at output 18 coincides with vector 10. However, apparatus 14 has a good chance of finding a higher-pel resolution motion estimation vector pointing, when starting from the same position as the initial lower-pel resolution motion estimation vector 10, to a higher-pel resolution position neighboring lower-pel position 12 and leading to a lower coding cost. Optimally, apparatus 14 would in any case find the higher-pel resolution motion estimation vector near vector 10, which leads to the lowest coding cost, but apparatus 14 of FIG. 1 is able to, statistically, find higher-pel resolution motion estimation vectors to which vectors such as vector 10 should be refined, which merely minorly decreases the coding efficiency when compared to the optimal case, but significantly decreases the computational complexity needed in order to perform the refinement. The way apparatus 14 achieves the reduction in computational complexity is described in more detail below.

Apparatus 14 of FIG. 1 comprises a higher-pel resolution vector ranker, in the following simply called ranker 20, and a refiner 22.

Ranker 20 is configured to determine a context 24 out of a set of contexts candidates based on coding costs of a set 26 of lower-pel resolution vectors within a neighborhood of the lower-pel resolution motion estimation vector 10, each context candidate being associated with a ranking 28 among a set 30 of higher-pel resolution candidate vectors surrounding the lower-pel resolution motion estimation vector 10. In the following, more mathematical description, the steps performed by ranker 20 are described to form the so-called offline phase. In this more mathematical description, ranker 20 is configured such that set 26 comprises the lower-pel resolution motion estimation vector 10 itself as well as the eight immediately neighboring lower-pel resolution vectors, i.e. immediately neighboring vertically, horizontally and diagonally, respectively. However, the set 26 could also be defined differently. For example, set 26 could exclude the lower-pel resolution motion estimation vector 10. Moreover, set 26 could comprise all lower-pel resolution vectors differing by equal to or less than two times the lower-pel pitch p or equal to or lower than two times $\sqrt{2}$ times p, respectively.

As described, the ranker 20 bases the determination of context 24 on the coding costs associated with each lower-pel resolution vector of set 26. The coding costs of lower-pel resolution vectors are, for example, already known from, by some optimization technique, selecting the lower-pel resolution motion estimation vector 10 out of the lower-pel resolution vectors. Otherwise, the coding costs of merely those lower-pel resolution vectors of set 26 would have to be determined by respective testing, i.e. by determining the coding cost which would be associated with using the respective lower-pel resolution vector for performing the motion compensated prediction, for which the coding cost is not yet known.

The outcome of the determination of ranker 20 is a context 24. A set of context candidates is available to ranker 20. For example, ranker 20 determines a context index C which indexes one context out of the set of context candidates. Each context candidate is, as mentioned above, associated with a ranking among a set of higher-pel resolution candidate vectors surrounding the lower-pel resolution motion estimation vector 10. In the following mathematical description, for example, this set 30 consists of the higher-pel resolution candidate vectors differing by less than or equal to the higher-pel resolution pitch q·$\sqrt{2}$, i.e. the ranking is among the higher-pel resolution candidate vectors neighboring the lower-pel resolution motion estimation vector horizontally, vertically and diagonally, respectively. The ranking associated with each context candidate thus defines an order among these higher-pel resolution motion vectors of set 30, the order being mutually different among the context candidates. In FIG. 1, the example of the set 30 of higher-pel resolution motion vectors, namely the example according to which the set merely encompasses the immediate high-pel resolution motion vectors, is illustrated in FIG. 1 by having the respective triangles hatched.

Moreover, FIG. 1 illustrates that apparatus 14 may, for instance, comprise a storage 32 for comprising a look-up table comprising an entry per context candidate, i.e. stores, for each context candidate, the associated ranking. Frankly speaking, the ranking orders the higher-pel resolution vectors such that they have a decreasing probability of leading to a lower coding cost than compared to the initial lower-pel resolution motion estimation vector 10, given that the coding costs associated with the lower-pel resolution vectors of set 26 indicate the associated context 24.

Refiner 22 uses ranking 28 of the context determined by ranker 20 so as to refine the lower-pel resolution motion estimation vector 10 to obtain a higher-pel resolution motion estimation vector such as, for example, vector 16. As outlined in more detail below, refiner 22 performs a sequential—according to the ranking associated with a context determined—testing of the set 30 of higher-pel resolution candidate vectors whether a current higher-pel resolution candidate vector of this set 30 has a lower coding cost associated therewith than a coding cost of the lower-pel resolution motion estimation vector 10 and a coding cost of any, in accordance with the ranking, preceding higher-pel resolution candidate vector, i.e. a higher-pel resolution candidate vector which has already been tested during the sequential testing by refiner 22. If this is the case, i.e. the current higher-pel resolution candidate vector has a lower coding cost associated therewith than a coding cost of the lower-pel resolution motion estimation vector 10 and a coding cost of any preceding higher-pel resolution candidate vector, refiner 22 selects the current higher-pel resolution candidate vector as the higher-pel resolution motion estimation vector 16. The sequential testing of refiner 22 is aborted according to a predetermined abort criterion. Several alternatives exist for defining the predetermined abort criterion, which leads to an aborting of the sequential testing so that, relating to all possible circumstances including, for example, the coding costs associated with set 26, an aborting of the sequential testing prior to having tested all higher-pel resolution candidate vectors of set 30 is possible. More advantageously, the predetermined abort criterion is such that an abort of the sequential testing takes place for more than half, or even all of, the manifold combinations of coding costs of the set 26 of lower-pel resolution vectors. Thus, refiner 22, at a reduced computation complexity, refines the lower-pel resolution motion estimation vector 10 to a higher-pel resolution motion estimation vector 16 which, statistically, leads to a coding cost which merely minorly deviates from a higher-pel resolution vector coding cost, which is optimally in an absolute sense relating to set 30 and among the available higher-pel resolution vectors.

In this regard the following is recalled: The lower-pel resolution motion estimation vector 10 itself forms one possible outcome of the sequential testing, namely in case of none of the higher-pel resolution vectors of set 30 leading to a better coding cost before the sequential testing is aborted. That is, differently speaking, that one outcome of the refinement of apparatus may be that none higher-pel refinement vector is found which results into a better coding cost than compared to vector 10.

In the below outlined more mathematical description, the steps taken by refiner 22 form a so-called online phase.

With respect to the above description the following is noted with respect to "testing" a certain vector for use as motion prediction such as the current higher-pel resolution vector of set 30 or any not a priory known lower-pel resolution vector of set 26. In this testing it is, for example, determined what coding rate results, i.e. what number of coding bits may be used, when using the respective vector for coding a predetermined block of a picture of the video, including (i.e. resulting after), for example, a coding of the motion-compensated prediction residual (remaining after motion compensated prediction using the respective vector) which residual coding may, for instance include entropy coding the residual. Additionally or alternatively, in this testing it is, for example, determined what coding distortion results, i.e. what reconstruction error upon re-deocoding caused by quantization of the motion compensated prediction residual, for example, is obtained, by decoding the coded version of the video as resulting when using the respective vector for coding the predetermined block of the picture of the video, including (i.e. resulting after), for example, a lossy coding (including quantization) of the motion-compensated prediction residual (remaining after motion compensated prediction using the respective vector). The coding cost may be defined as a linear combination of both measures, i.e. coding rate and coding distortion, such as for example according to equation 1. Instead of actually performing the coding down to the entropy coding domain, i.e. including motion compensated prediction as well as entropy coding the prediction residual, it may for example suffice to estimate to entropy coded bits that may be used to code the video using the respective vector for motion compensated prediction of the predetermined bock.

After having described the apparatus 14 of FIG. 1 rather generally, the above announced more mathematical description is provided. In order to ease the understanding of the more mathematical description brought forward below, it is noted that the higher-pel resolution is called in the following the sub-pel resolution while the lower-pel resolution is treated as the integer-pel resolution. Nevertheless, the description brought forward below may easily be extended to other cases where, for instance, the motion estimation vector to be refined is already represented in a higher accuracy than compared to the integer-pel resolution.

Context-based approaches have been successfully applied in video encoders in order to speedup certain decision processes, such as entropy coding [18]. In this paper, a general framework for context-based sub-pel refinement is considered, while introducing a specific context for which reasonable results in terms of the trade-off between computational complexity reduction and coding efficiency loss are reported. The apparatus of FIG. 1 uses an offline as well as an online phase, as described in more detail below.

During the offline phase performed by ranker 20, the goal is to order the sub-pel positions 30 according to their probability of yielding a performance gain in terms of coding efficiency. Let m be the MV obtained from an arbitrary integer-pel accuracy search algorithm and let S be a set of allowed sub-pel displacements $\vec{w}$ surrounding $\vec{m}$. Furthermore, let f be a cost function, calculating the cost of a MV, for instance, where $f(\vec{a})>f(\vec{b})$ means that $\vec{b}$ is to be chosen over $\vec{a}$. Also, the performance gain is supposed to be defined according to Equation (2).

$$p(\vec{s} \in S) = \begin{cases} f(\vec{m}) - f(\vec{s}) & \text{if } f(\vec{m}) - f(\vec{s}) > 0 \\ 0 & \text{otherwise} \end{cases} \quad (2)$$

In addition, an arbitrary context ctx(C) is assumed with C being the input information and ctx being a function that processes this input information. Then, for each $\vec{s} \in S$, the expected performance gain $p(\vec{s})$ resulting from selecting $\vec{s}$ over $\vec{m}$ by using n learning samples is calculated, as shown in Equation (3).

$$\exp(\vec{s} \mid ctx(C)) = \frac{\sum_{1}^{n} p(\vec{s})}{n} \quad (3)$$

That is, in order to build the look-up table mentioned with respect to, and illustrated in FIG. 1, the coding cost gain associated with the set 30 of neighboring higher-pel resolution motion vectors has been determined, by testing, for a certain number of coding blocks within certain test videos, and the central tendency has been determined of the resulting distribution of coding cost gains, i.e. the reduction in coding relative to the coding cost of the lower-pel resolution motion estimation vector 10 surrounded by factors of set 30, with the central tendency being determined for each higher-pel motion vector of set 30 separately, and with this determination for set 30 being done for each context candidate separately. The result: expected coding cost gains associated with the higher-pel resolution vectors of set 30 given that a certain context applies, i.e. a certain context exists as indicated by the lower-pel resolution vectors of set 26. The ranking stored for the respective context candidate is such that the higher-pel resolution vectors of set 30 are ordered with decreasing coding costs gain.

As a result, the position yielding the highest expected performance gain (i.e. $\vec{s}_{exp}$) is determined from Equation (4).

$$\vec{s}_{exp} = \underset{\vec{s} \in S}{\arg\max} \exp(\vec{s} \mid ctx(C)) \quad (4)$$

In turn, by employing a cross validation, the context may now be evaluated. The two metrics which can be used for the purpose of evaluation are an overall success rate, i.e. the probability of finding optimal sub-pel positions, as well as the generated encoding cost overhead, i.e. the overhead of the encoding cost compared to the corresponding optimal position. It should be noted that a low overall success rate may still correspond to a well-performing context model in case of generally selecting a near-optimal position (i.e. the position which yields an encoding cost sufficiently close to the optimum).

The online phase performed by refiner 22 forms the actual encoding process during which the information obtained from the offline phase is applied by using, for example, the algorithm shown in Algorithm 1 below. Here, crit is a criterion, i.e. the predetermined abort criterion already denoted above, for deciding whether the online search algorithm should proceed or should be terminated.

Algorithm 1 Context-based fractional search bestMv ← $\vec{m}$
    cost ← f (bestMv)
    while crit holds do
        nextMv ← next expected best MV
        If necessary, perform up-sampling for nextMv
        newCost ← f (nextMv)
        if newCost < cost then -continued Algorithm 1 Context-based fractional search Update cost and bestMv
    end if
  end while
  return bestMv That is, in algorithm 1, bestMv is a variable which is, at the beginning initialized with a lower-pel resolution motion estimation vector 10 to be refined itself. The variable "cost" is initialized with the coding cost associated with the factor 10. The while loop then loops through the following steps: first, the abort criterion is tested. Examples thereof are provided below. Next, variable nextMV is amended to point to the current higher-pel motion vector of set 30 in line in accordance with the ranking of the currently determined context. The coding cost for this current higher-pel resolution motion vector is determined by testing and if this coding cost is less than a coding cost of variable "costs", then the current higher-pel motion vector is appointed the higher-pel resolution motion estimation vector at least preliminarily until the aborting of the while loop, with appropriately setting "cost" to eb equal to the coding cost of the current higher-pel resolution motion vector. That is, "cost" is set to be equal to the coding cost of nextMv and bestMv is set to be equal to nextMv. Then the current while loop ends and the criterion is checked again. That is, according to algorithm 1, it may even be that the predetermined criterion suggests that not even one of the higher-pel resolution vectors of set 30 should be tested and that the pre-initialized motion vector, namely the lower-pel resolution motion estimation vector 10 to be refined itself, shall be the higher-pel resolution motion estimation vector.

A fairly simple example for implementing crit is depicted in Equation (5). An upper bound u of search steps to be performed can be defined, and i denotes a count of already performed search steps.

$$i-u<0 \quad (5)$$

Alternatively, a minimal performance gain $p_{min}$ expected from a particular position to be considered, can be further defined as shown in Equation (6). In turn, Equation (6) is then evaluated first using the sub-pel position that yields the highest expected performance gain, and second, using the sub-pel position with the second highest expected performance gain, and so on, as long as Equation (6) holds.

$$\exp(\vec{s}_{next}|\text{ctx}(C))-p_{min}>0 \quad (6)$$

In order to meet the real-time processing requirement, an adaptive time-constrained parameter may be further employed, when determining the crit criterion. Let t be the time that may be used to calculate $f(\vec{s} \in S)$ and $\mu$ be a weighting parameter, which has a positive value. Then, crit can be determined according to Equation (7), while keeping this in equation valid.

$$\exp(\vec{s}_{next}|\text{ctx}(C))-(\mu \times t)>0 \quad (7)$$

In other words, an additional search point is considered only when it is worth to invest additional processing time in terms of computational complexity. It should be noted that t may be determined during the offline phase and $\mu$ may be selected in an empirical manner.

In other words, the refiner 22 may be configured so that the predetermined abort criterion depends on (A) a number of previously tested higher-pel resolution candidate vectors, namely i in the above formula (5), and/or (B) an estimation for a coding cost gain associated with the current higher-pel resolution candidate vector, namely the central tendency of the gain as obtained for the respective vector at the condition of the current context in the above formulae (6) and (7), the estimation being defined, for example, by (1) the current higher-pel resolution candidate vector's displacement relative to the lower-pel resolution motion estimation vector, namely by way of the nomination of $\vec{s}_{next}$ in the above formula (6), and/or (2) the context determined, namely by way of the nomination of context C in the above formula (6); and/or (C) a maximum number of higher-pel resolution candidate vectors to be tested, namely by way of the nomination of u in the above formula (5); and/or (D) a computational cost or cost estimate, measured for example in time, of testing the current higher-pel resolution candidate vector, namely by way of the nomination of tin the above formula (7). That is, as shown by formula (5), the predetermined abort criterion may simply determine an upper limit for the number of higher-pel resolution vectors sequentially tested by refiner 22 according to the ranking predescribed by the context determined. Alternatively, the sequential test may be aborted prior to (as done in Algorithm 1) or after realizing that the current higher-pel resolution candidate vector's coding cost improvement (gain) relative to the lower-pel resolution motion estimation vector succeeds some threshold (see formulae (6) and (7)). The coding cost gain may have been obtained by training as illustrated in formulae (6) and (7) and stored in a look-up table for the higher-pel resolution vectors of set 30, namely one gain estimate per each pair of context candidate and vector of set 30. Alternatively, a coding gain estimation for the currently to be tested vector of set 30 may be computed online analytically depending on (1) the displacement and/or (2) the context. The threshold may be fixed as in (6) or may be determined based on an estimate of the computational testing complexity for testing the current higher-pel resolution vector. Here, the complexity may differ among the higher-pel resolution vectors. For example, the complexity may be greater for even-higher-pel resolution vectors compared to higher-pel resolution vectors. The threshold may be determined based on the complexity estimation by way of a scaling of the complexity using a factor $\mu$ as shown in (7), i.e. may be proportional to the testing complexity, or using another monotonically increasing function applied to the complexity measure. The testing complexity measures thus the complexity of determining the current higher-pel resolution candidate vector's coding cost that may be used to determine whether same is lower than the coding cost of the lower-pel resolution motion estimation vector and lower than a coding cost of any preceding higher-pel resolution candidate vector. The complexity may be measured, for example, in time or number of computer instructions that may be used for obtaining the coding cost of the currently tested vector. Any logical combination of the above-outlined abort criterions may be used as well so as to form another example for an abort criterion such as a OR or AND combination.

In order to apply the approach to half-pel accuracy search, a set of allowed sub-pel displacements S (as defined in the above-outlined manner) should consist of allowed half-pel displacements $S_H$, which surround the integer-pel accuracy vector $\vec{m}$, and therefore, $|S_H|=8$. It would also be possible to instantly address all possible quarter-pel positions $S_Q$ surrounding $\vec{m}$, thereby resulting in $|S_Q|=48$ and $S_H \subset S_Q$.

However, the approach adopts the assumption that the optimal quarter-pel position is adjacent to the optimal half-pel position as has been discussed in the context of the conventional interpolation-and-search method (see introductory portion of the specification). Therefore, $S_H$ is used first to identify a half-pel accuracy vector $\vec{h}$, and then, 8 quarter-pel positions $$\{\vec{q} \in S_Q | |\vec{q} - \vec{h}| \le \frac{1}{\sqrt{s}}\}$$

are selected for determining the final quarter-pel position. The expected performance gain for quarter-pel positions is then obtained by using information from the prior half-pel step. More precisely, the expected performance gain for each quarter-pel position is calculated on the basis of every possible prior-selected half-pel position as follows:

$$\exp(\vec{q} | ctx(C), \vec{h}) = \frac{\sum_{1}^{n} p(\vec{q})}{n} \quad (8)$$

Figure 2:
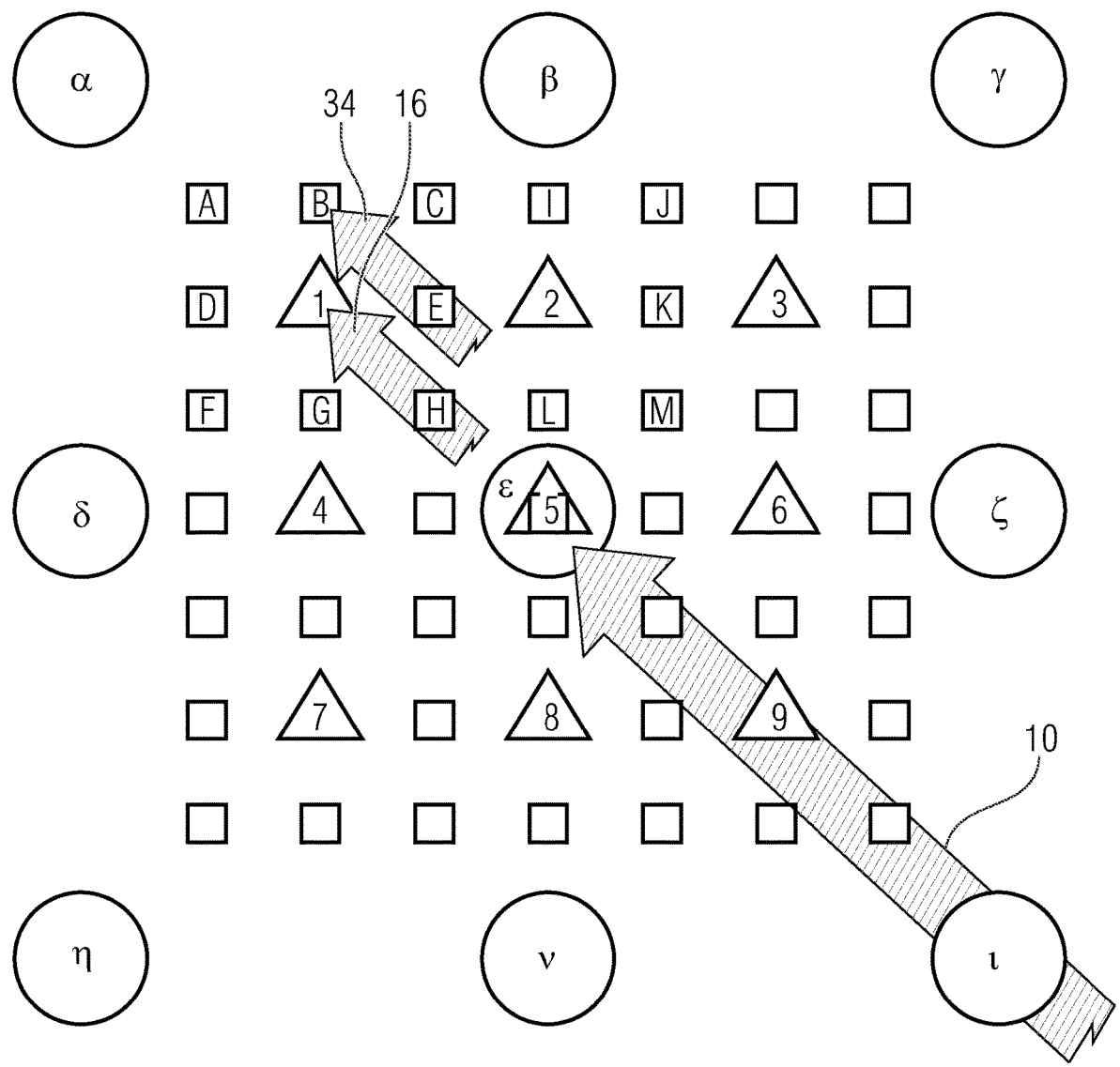
FIG. 2 shows a schematic diagram illustrating a neighborhood of a lower-pel resolution motion estimation vector including higher-pel resolution vector positions as well even-higher-pel resolution motion vector positions.

That is, apparatus 14 of FIG. 1 may act in stages so as to first refine the lower-pel resolution motion estimation vector 10 onto a higher-pel resolution motion estimation vector 10 and then, in a second stage, further refining the thus obtained higher-pel resolution motion estimation vector onto an even-higher-resolution motion estimation vector, which for illustration purposes is denoted 34 in FIG. 2. FIG. 2 shows the neighborhood of the initial lower-pel resolution motion estimation vector 10 to be refined including the lower-pel resolution vectors/positions indicated using circles and including the higher-pel resolution vectors/positions indicated using triangles. The low-pel resolution vectors are distinguished using Greek letters. The middle one of the nine low-pel resolution vectors corresponds to the low-pel resolution motion estimation vector 10 to be refined initially. These nine low-pel resolution vectors form set 26 used to determine the context in accordance with the present embodiment, but as already denoted above a larger neighborhood of position c may be used alternatively. Further, the eight surrounding higher-pel resolution vectors surrounding vector 10 and vector 10 together are, for the sake of alleviating the complexity of FIG. 2, the only higher-pel resolution vectors depicted in FIG. 2 using the triangles, same being distinguished from one another by 1 to 9. FIG. 2 illustrates the possibility that the upper left neighboring higher-pel resolution vector, namely the one indexed using 1 has been selected by apparatus 14 in accordance with a first stage processing as the higher-pel resolution motion estimation vector 16. In accordance with the extension towards an even-higher-pel resolution refinement just described, apparatus 14 acts as follows. FIG. 2 shows the possibility that the even-higher-pel resolution vectors point to positions arranged in a grid of a mean pitch even smaller than the pitch of the higher-resolution vectors, namely at a quarter of the pitch of the lower-pel resolution vectors so that an even-higher resolution vector is positioned in the middle between each pair of neighboring higher-pel resolution vectors. In particular, in FIG. 2 the even-higher-pel resolution vectors are illustrated using small squares.

As became clear from the above discussion, refiner 22 is configured in such a manner that the higher-pel resolution motion estimation vector 16 may become one of the set 30 of higher-pel resolution candidate vectors, i.e. $\{1, 2, 3, 4, 6, 7, 8, 9\}$, and the lower-pel resolution motion estimation vector 10 itself, i.e. $\{5\}$, i.e. one of $\{1, \ldots, 9\}$. In the second stage apparatus 14 is to refine the higher-pel resolution motion estimation vector 16 further, namely onto the even-higher-pel resolution, and to this end, each context candidate is, for each of the set of higher-pel resolution candidate vectors and the lower-pel resolution estimation vector 10, i.e. for each of $\{1, \ldots, 9\}$ also associated with a ranking among a set of even-higher-pel resolution candidate vectors, surrounding the respective higher-pel resolution candidate vector and the lower-pel resolution motion estimation vector, respectively. This is depicted in FIG. 3. FIG. 3 shows an example for the look-up table which may be stored in storage 32 of FIG. 1. The first two columns correspond to the look-up table described so far and illustrated in FIG. 1: the first column lists the available context candidates 1, N, and the second column from the left hand side illustrates the associated ranking among the set 30, i.e. $\{1, 2, 3, 4, 6, 7, 8, 9\}$. As just-described, each of higher-pel resolution vectors $\{1, \ldots, 9\}$ may be appointed the higher-pel resolution motion estimation vector 16, and for each of these nine possibilities, each context candidate also has a ranking stored in the look-up table, which defines a ranking among the aid immediately neighboring even-higher pel-resolution vectors of the respective higher-pel resolution vector. In FIG. 2, for example, the immediately neighboring even-higher-pel resolution vectors of higher-pel resolution vector 1 have been distinguished from one another using A to H. Each context candidate comprises a ranking among these eight even-higher-pel resolution vectors A to H, which orders same in the order of the decreasing probability of improving the coding cost of higher-pel resolution motion estimation vectors 16 given that the latter falls onto higher-pel resolution vector 1 and given that the respective context candidate applies which has been determined on the basis of the lower-pel resolution vector's coding costs.

Thus, the refiner 22 then further refines the higher-pel resolution motion estimation vector 16 so as to obtain an even-higher-pel resolution motion estimation vector 34 by applying the sequential test procedure using the same or another predetermined abort criterion onto the set of even-higher-pel resolution motion vector candidates using the ranking thereamong as defined by the current context The test methodology along with the experimental results is discussed in detail in the following section.

The experimental results have been obtained by using the HEVC reference software HM 12.0. The Random Access (RA) and Low Delay P (LDP) configurations have been considered, according to the HEVC Common Test Conditions, as defined in [20] and specified in Table I. It should be noted that the Class E sequences represent typical video conferencing content, which corresponds to relatively low motion activity. Also, the Class F sequences mainly consist of Computer-Generated Imagery (CGI) content.

TABLE I

Evaluated Common Test Condition Sequences [20]

| Class | Resolution | Nr. of sequences | RA | LD P |
|-------|------------|------------------|----|----|
| A | 2660 × 1600 | 4 | ✓ | |
| B | 1920 × 1080 | 5 | ✓ | ✓ |
| C | 832 × 480 | 4 | ✓ | ✓ |
| D | 416 × 240 | 4 | ✓ | ✓ |
| E | 1280 × 720 | 3 | | ✓ |

TABLE I-continued

Evaluated Common Test Condition Sequences [20]

| Class | Resolution | Nr. of sequences | RA | LD P |
|---|---|---|---|---|
| F | 1280 × 720 | 2 | ✓ | ✓ |
|  | 1024 × 768 | 1 |  |  |

Table II presents the corresponding coding efficiency gains for both RA and LDP configurations by enabling the sub-pel refinement (compared to considering the full-pel positions only), when applying the already mentioned interpolation-and-search method presented in Section II-A. It should be noted that since the RA configuration allows a weighted combination of two integer-pel accuracy prediction signals (for enabling the B-frame prediction), the integer-pel precision ME may already result in sub-pel displacements. In turn, this justifies the significantly higher performance gains for the LDP configuration, as shown in Table II, since in such a case only P-frame prediction is enabled.

TABLE II

Coding Efficiency Gain for Performing Sub-Pel Refinement Compared to Considering Full-pel Positions Only

|  | A | B | C | D | E | F |
|---|---|---|---|---|---|---|
| RA | −7.6% | −7.6% | −11.2% | −12.4% | — | −2.8% |
| LDP | — | −15.4% | −19.7% | −23.5% | −9.4% | −4.9% |

Regarding the computational complexity issue, as it has already been noted, this approach incorporates 8 search points for the half-pel refinement and additional 8 points for the quarter-pel accuracy search as well as for the corresponding up-sampling operations.

Figure 4:
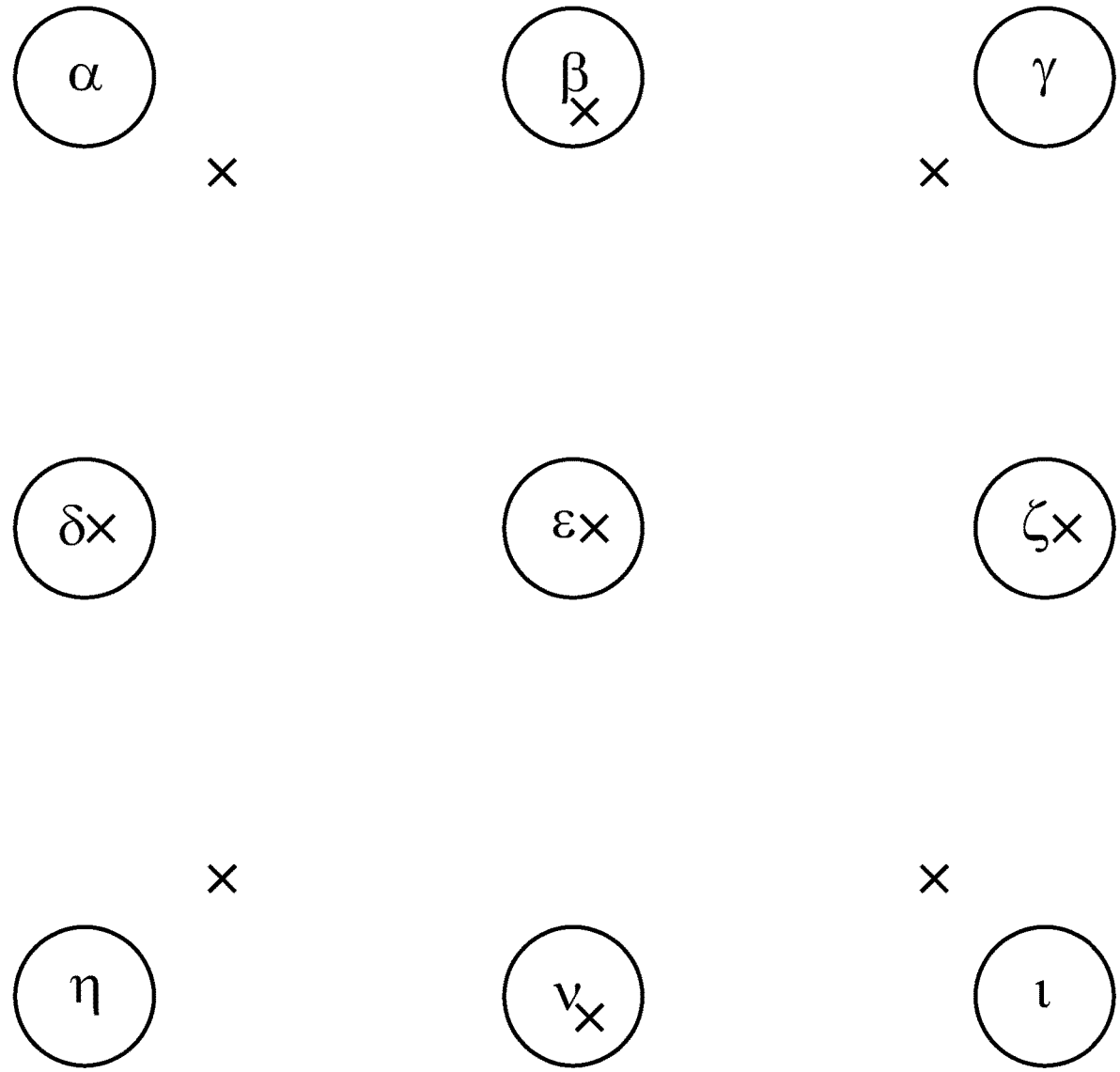
FIG. 4 shows a schematic diagram illustrating the weighting centroids used in order to compute the context in accordance with an embodiment of the present application.

In the following, possibilities are presented how the context modeling could be chosen. In accordance with the details set out hereinafter, ranker 20 is configured to perform the determination of the context by applying a vector-valued function, an example of which is presented below in equation 11, onto the coding costs of the set 26 of lower-pel resolution vectors to obtain a vector comprising a vector component per context candidate. This vector is denoted C in the following. Herein, for each context candidate, the respective vector component is a measure for a locally weighted average of the coding cost of the set of lower-pel resolution vectors, wherein a weighting centroid of the locally weighted average is spatially mutually separated from the vector components of the vector. Then, ranker 20 determines the minimum vector component of the vector as determined by the minimum function in equation 11 so that the context candidate associated with the minimum vector component becomes or is appointed in the context determined by ranker 20. In particular, in accordance with the specific details presented below, ranker 20 is configured such that the cardinality of the set of context candidates, i.e. N in FIG. 3, for example, is nine with the weighting centroids mutually differing in directional displacement relative to the lower-pel resolution motion estimation vector. That is, in case of the following description, the nine context candidates correspond to nine weighting centroids which, as illustrated in FIG. 4, spatially differ from each other in that they are spatially displaced from the lower-pel resolution estimation vector position c into different directions, namely one of the eight horizontal, vertical and/or diagonal directions, are not displaced at all, i.e. with the centroid lying in c itself. That is, the vector-valued function in accordance with the description brought forward below reveals a locally weighted average of the coding costs of the lower-pel resolution vectors of set 26 with the weighting centroid lying at the just-outlined and in FIG. 4 illustratively depicted positions.

Figure 5B:
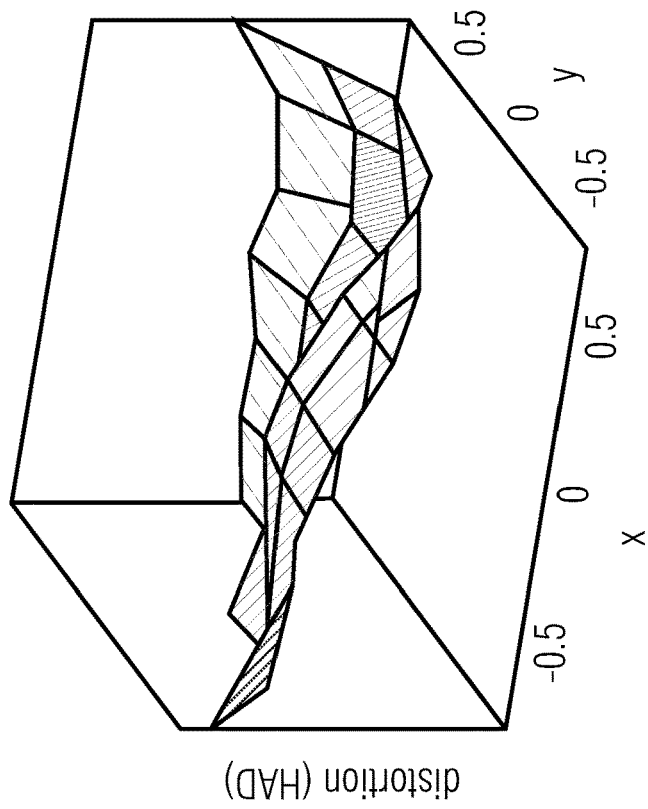
FIGS. 5a and 5b show examples of a quarter-pel distortion map where position (0, 0) corresponds to the selected integer-pel motion vector.
Figure 5A:
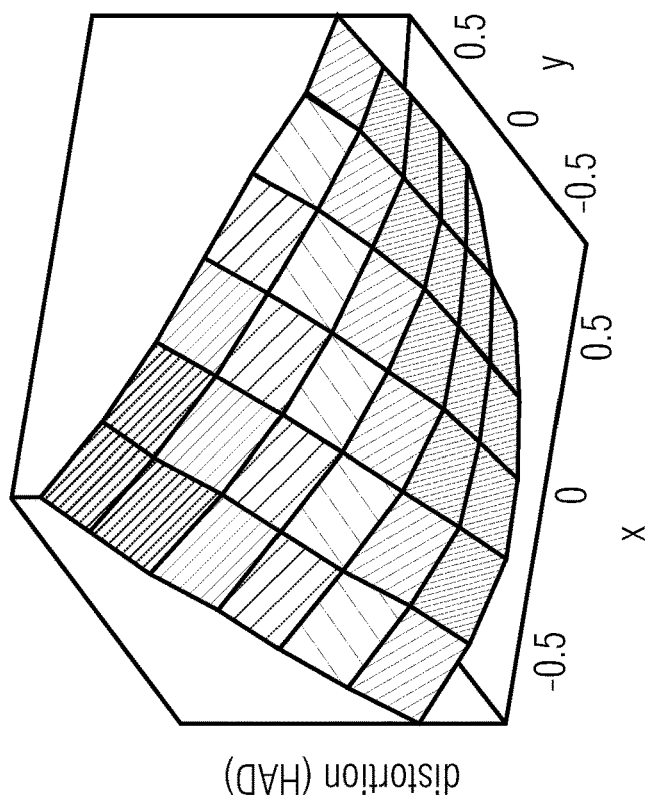

Several studies, as those presented for example in [15] and [16], report a correlation between distortions obtained at integer-pel positions adjacent to the position chosen and the best sub-pel position. In the course of this work, the distortion values for the selected integer positions as well as the distortion maps, which contain the adjacent integer positions and the adjacent half-pel/quarter-pel precision distortion values, were determined. Regarding the integer-pel positions, the sum of absolute differences (SAD) was used as a distortion metric. Also, with respect to the sub-pel position, the sum of Hadamard transformed differences (HAD) was employed. Two examples of such distortion maps are provided in FIG. 5. Furthermore, it was observed that the optimal sub-pel positions are evenly distributed, and therefore, no assumptions regarding the general priorities of positions could be made.

$$C = \vec{f} = \begin{pmatrix} f(\vec{x}_1) \\ f(\vec{x}_2) \\ f(\vec{x}_3) \\ f(\vec{x}_4) \\ \infty \\ f(\vec{x}_6) \\ \ldots \\ f(\vec{x}_9) \end{pmatrix} \qquad (9)$$

Figures 6, 7:
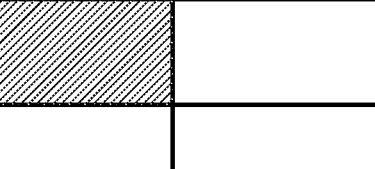
FIG. 6 shows positional notations relative to the lower-pel resolution motion estimation vector and higher-pel resolution motion estimation vector, respectively.
FIG. 7 shows the weightings associated with the computation of a first component of the vector-valued context computation function in accordance with an embodiment of the present application.
Figure 8B:
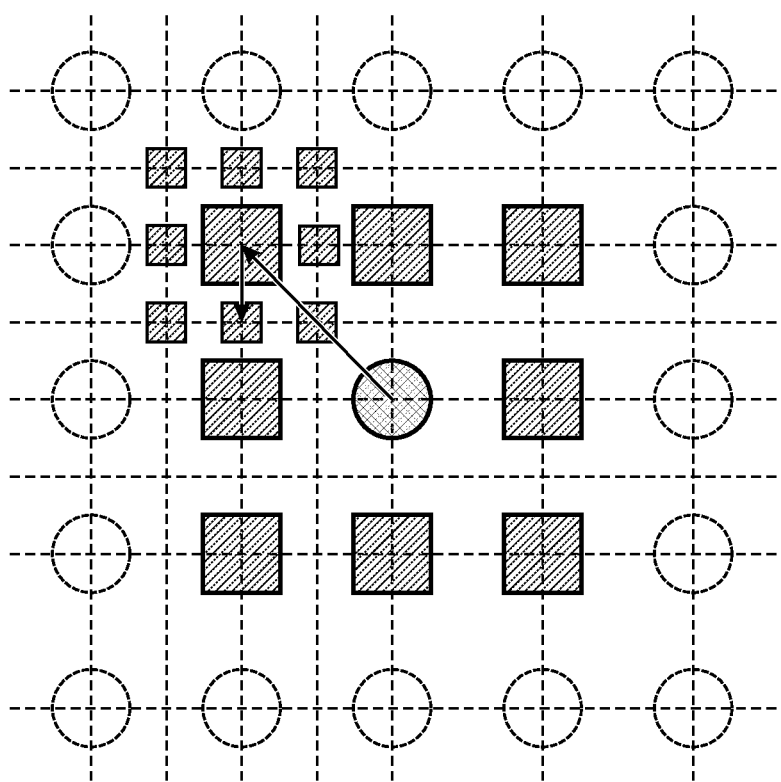
FIGS. 8a and 8b show examples of a conventional interpolation-and-search method, wherein the circles represent integer-pel positions, while larger squares denote half-pel positions and smaller squares the quarter-pel positions.
Figure 8A:
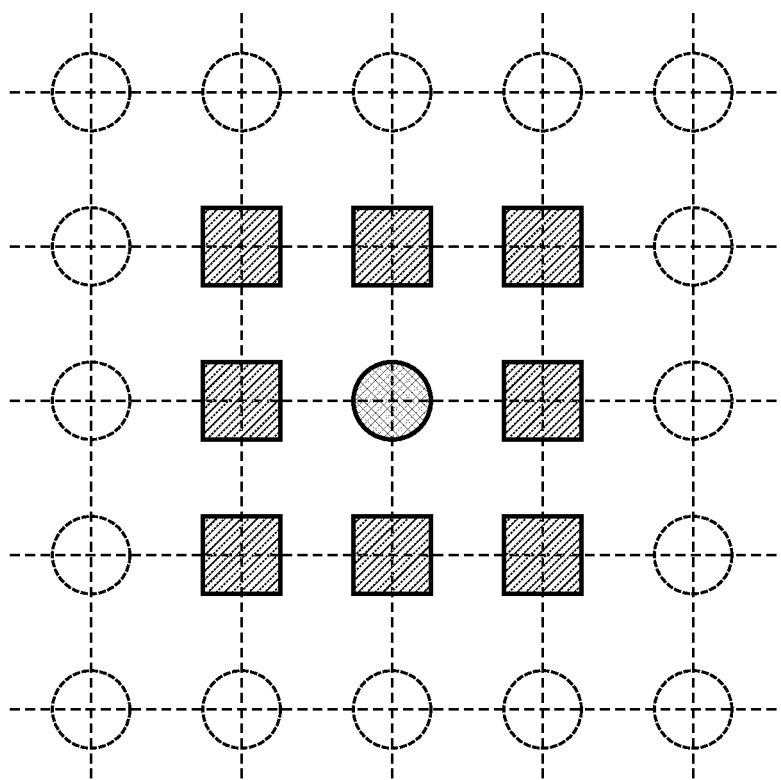

Let $\vec{x}_1, \ldots, \vec{x}_4, \vec{x}_6, \ldots, \vec{x}_9$ be the integer positions surrounding $\vec{m}$ from the top-left to bottom-right, as shown in FIG. 6. Also, let $\vec{x}_5 = \vec{m}$. The distortion value for position $x_i$ is given by $f(x_i)$, while C is defined in Equation (9). It is noted that the training data was obtained for 10 frames for each of the Common Test Condition [20] sequences presented in Table I. Further, the integer accuracy MVs were obtained by using the fast search algorithm, which is an integral part of HM 12.0.

In the following, the context calculation for the sub-pel positions is presented.

The calculation of context ctx(C) is given by Equation (11), thereby selecting the position of the smallest element from the vector, which is obtained by multiplying a weighting matrix $M_{9,9}$, as defined in Equation (10), and $\vec{f}$, as defined in Equation (9). Therefore, each row of the vector, resulting from $M \times \vec{f}$, corresponds to the weighted combination of three neighboring positions, as further schematically presented in FIG. 7.

$$M = \begin{bmatrix} 3 & 2 & 0 & 2 & 0 & 0 & 0 & 0 & 0 \\ 2 & 3 & 2 & 0 & 0 & 0 & 0 & 0 & 0 \\ 0 & 2 & 3 & 0 & 0 & 2 & 0 & 0 & 0 \\ 2 & 0 & 0 & 3 & 0 & 0 & 2 & 0 & 0 \\ 0 & 0 & 0 & 0 & 1 & 0 & 0 & 0 & 0 \\ 0 & 0 & 2 & 0 & 0 & 3 & 0 & 0 & 2 \\ 0 & 0 & 0 & 2 & 0 & 0 & 3 & 2 & 0 \\ 0 & 0 & 0 & 0 & 0 & 0 & 0 & 3 & 2 \\ 0 & 0 & 0 & 0 & 2 & 0 & 2 & 3 \end{bmatrix} \quad (10)$$

$$ctx(C) = \min_i (M \times \vec{f}) \quad (11)$$

FIG. 7 shows a visual example of calculating the first row of a vector, generated by $M \times \vec{f}$ multiplication process. The black square position corresponds to a center of the search (i.e. the selected full-pel position for the first search step or the selected half-pel position for the second search step); the gray cells correspond to positions, where the distortion values are not considered; and scalars indicated within the white cells represent distortion weights of each corresponding position, thereby resulting in the following overall distortion calculation: $3 \times f(\vec{x}_1) + 2 \times f(\vec{x}_2) + 2 \times f(\vec{x}_4)$.

Thus, relating the specific example explained above with respect to equation 10 and FIG. 7 to FIG. 4, the centroid lying diagonally to the top left of vector 10 results from the weightings 3, 2 and 2 for the lower-pel resolution vectors' coding costs at α, β and ε, respectively. However, instead of using a vector-valued function of nine components, one for each context candidate, more components/context candidates could be used to spatially distribute the weighting centroids in a manner so that the centroids also comprise centroids which differ by more than p/2 with respect to the radial distance to position of vector 10. Moreover, an alternative way of determining the context based on set 26 could be the determination of a linear regression function through the coding costs of vectors of set 26 with quantizing the normal vector of the resulting linear regression plane through the coding costs of vectors of set 26 onto any of a zero vector, and the eight horizontal, vertical and diagonal directions such as, for example, by projecting the normal vector of the linear regression plane along the axis of coding costs, i.e. by quantizing the direction of greatest steepness of the linear regression plane onto any of the eight directions and the zero vector. Again, the ranker would be configured such that the number of context candidates would be nine. Generally, in accordance with both alternatives outlined above, i.e. the one using the vector-valued function with subsequent selection of the minimum component as well as the one using linear regression, end-up in a set of context candidates, each of which is a nominal measure of a direction into which the local plot of coding costs at the set 26 of lower-pel resolution vectors decreases most strongly with the nominal measure including zero steepness as well as a number N−1 of different angular directions pointing away from vector 10.

Thus, ranker 20 may be configured such that the set of context candidates has N context candidates and represents a nominally scaled measure of a direction into which the spatial distribution of coding costs of the set of lower-pel resolution vectors locally decreases at the lower-pel resolution motion estimation vector including no decrease and N−1 directional values.

Table III and Table IV present experimental results by applying Algorithm 1 and using Equation (5) with u=1, . . . , u=3 under previously described test conditions. As can be seen, for u=3, negligible BD-rate losses are obtained for both RA and LDP configurations. On the other hand, it should be noted that u=1 results in achieving at least ~75% coding efficiency gain compared to the conventional interpolation-and-search approach, see Table V and Table VI. Especially, for the HD sequences (i.e. Class B [20]), more than 80% of the coding efficiency gain obtained from the reference algorithm is reported. With regard to the negligible BD-rate losses shown in Table III and Table IV, it should be noted that similar losses are also presented in [16] and [17]. However, the proposed framework is much more robust, since u is used in an adaptive manner (rather than just static), thereby enabling to handle cases when the statistical prediction fails.

TABLE III

Coding Efficiency Losses for the RA Configuration

|  | A | B | C | D | F | Average |
|---|---|---|---|---|---|---|
| u = 1 | 1.1% | 1.4% | 2.4% | 3.0% | 0.7% | 1.7% |
| u = 2 | 0.6% | 0.7% | 1.4% | 1.8% | 0.4% | 1.0% |
| u = 3 | 0.3% | 0.4% | 0.7% | 0.7% | 0.3% | 0.5% |

TABLE IV

Coding Efficiency Losses for the LDP Configuration

|  | B | C | D | E | F | Average |
|---|---|---|---|---|---|---|
| u = 1 | 2.1% | 3.3% | 4.8% | 1.3% | 0.9% | 2.5% |
| u = 2 | 1.0% | 1.9% | 2.6% | 0.8% | 0.5% | 1.4% |
| u = 3 | 0.4% | 0.8% | 1.1% | 0.3% | 0.3% | 0.6% |

TABLE V

Ratio Between Coding Efficiency Gains Obtained using the Context-Based Sub-Pel Refinement Algorithm and the Conventional Interpolation-and-Search as Depicted in Table II for the RA Configuration

|  | A | B | C | D | F | Average |
|---|---|---|---|---|---|---|
| u = 1 | 86% | 82% | 79% | 76% | 75% | 80% |
| u = 2 | 92% | 91% | 88% | 85% | 86% | 88% |
| u = 3 | 96% | 95% | 94% | 94% | 89% | 94% |

TABLE VI

Ratio Between Coding Efficiency Gains Obtained using the Context-Based Sub-Pel Refinement Algorithm and the Conventional Interpolation-and-Search as Depicted in Table II for the LDP Configuration

|  | B | C | D | E | F | Average |
|---|---|---|---|---|---|---|
| u = 1 | 86% | 83% | 80% | 86% | 82% | 83% |
| u = 2 | 94% | 90% | 89% | 91% | 90% | 91% |
| u = 3 | 97% | 96% | 95% | 97% | 94% | 96% |

The computational complexity of the proposed context-based sup-pel refinement algorithm is a function of search points to be examined, which clearly depends on the value of u. In this respect, Table VII provides an overview regarding the reduction of search points of the proposed context-based sup-pel refinement algorithm compared to the conventional interpolation-and-search method for both RA and LDP configurations. As can be seen, the number of search points is reduced significantly, thereby resulting in tremendous computational complexity savings. It also should be noted that, similarly to approaches discussed in Section II-C, for u=1 no interpolation may be used.

TABLE VII

Search Point Reductions for Configurations Presented in Table III and Table IV

| | Interpolation-and-search | | Context-based approach | | Search point |
|---|---|---|---|---|---|
| | Half-pel | Quarter-pel | Half-pel | Quarter-pel | reduction |
| u = 1 | 8 | 8 | 1 | 1 | 87.5% |
| u = 2 | | | 2 | 2 | 75% |
| u = 3 | | | 3 | 3 | 62.5% |

In this work, a context-based sup-pel refinement framework for the HEVC compliant encoding process is presented. By providing parametrization examples, it was shown that the algorithm is capable of keeping losses at a low level, while tremendously reducing computational complexity in terms of search point reduction. It was also shown that an upper bound of a single search step (i.e. u=1), which corresponds to a search point reduction of 87.5%, still results in achieving ~75% of the coding efficiency gain as obtained when applying the conventional interpolation-and-search method. For the HD-resolution sequences, a coding efficiency gain of more than 80% is obtained. In addition, various capabilities of steering the trade-off between computational complexity and encoding performance were introduced, thereby demonstrating significant flexibility of the proposed framework. Regarding future work to be carried out, an implementation of the adaptive steering behavior would allow to achieve an optimal trade-off between the coding efficiency loss and the run-time that may be used, thereby enabling to yield even lower BD-rate losses.

Thus, above description describes a concept which may be embodied so as to alleviate problems which H.265/MPEG-H High Efficiency Video Coding (HEVC) compliant encoding processes face, namely the challenge of high computational complexity due to supporting a large number of coding modes. Particularly, in case of inter-picture prediction, most of the computational resources are allocated for the motion estimation (ME) process. In turn, the motion estimation and corresponding motion compensation (MC) processes enable improving coding efficiency by addressing blocks of video frames as corresponding displacements from one or more reference blocks, thereby exploiting temporal redundancy. These displacements do not necessarily have to be limited to integer picture element (pel) positions, but may have an accuracy of half-pel or quarter-pel positions, which are identified during sub-pel refinement. Hereinbefore, a context-based scheme for sub-pel refinement has been described, which takes advantage of already obtained information in prior ME steps and provides significant flexibility in terms of parametrization in order to adaptively achieve a desired trade-off between computational complexity and coding efficiency. According to the experimental results, a significant decrease in the number of search points can be achieved, such as 62.5% search point reduction as a trade-off of only 0.4% Bjøntegaard-Delta (BD)-rate loss for the High Definition (i.e. 1080p-resolution) video sequences.

In other words, an adaptive algorithm for sub-pel refinement has been presented. It is based on the conditional probability of specific sub-pel positions to yield a performance gain compared to the prior-selected integer-pel position in terms of coding efficiency. In order to determine these conditional probabilities, a context-based framework is introduced, whereas a context to be chosen should exploit either already available information relatively low computational cost. As an example, a specific context has been presented above, for which a good trade-off in terms of computational complexity and coding efficiency has been experimentally confirmed.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] Bossen, F., Bross, B., Suhring, K., Flynn, D., *HEVC Complexity and Implementation Analysis*, Circuits and Systems for Video Technology, IEEE Transactions on, vol. 22, no. 12, pp. 1685, 1696, December 2012

[2] Bross, B., Schwarz, H., Marpe, D., *The New High-Efficiency Video Coding Standard*, SMPTE Motion Imaging Journal 122.4 (2013): 25-35.

[3] Marpe, D., Schwarz, H., Bosse, S., Bross, B., Helle, P., Hinz, T., Kirchhoffer, H., Lakshman, H., Tung Nguyen, Oudin, S., Siekmann, M., Suhring, K., Wnken, M., Wegand, T., *Video Compression Using Nested Quadtree Structures, Leaf Merging, and Improved Techniques for Motion Representation and Entropy Coding*, Circuits and Systems for Video Technology, IEEE Transactions on, vol. 20, no. 12, pp. 1676, 1687, December 2010

[4] Helle, P., Oudin, S., Bross, B., Marpe, D., Bici, M. O., Ugur, K., Jung, J., Clare, G., Wiegand, T., *Block Merging for Quadtree-Based Partitioning in HEVC*, Circuits and Systems for Video Technology, IEEE Transactions on, vol. 22, no. 12, pp. 1720, 1731, December 2012

[5] Sullivan, G. J., Wiegand, T., *Rate-distortion optimization for video compression*, Signal Processing Magazine, IEEE, vol. 15, no. 6, pp. 74, 90, November 1998

[6] Sullivan, G. J., Ohm, J., Woo-Jin Han, Wiegand, T., *Overview of the High Efficiency Video Coding (HEVC) Standard*, Circuits and Systems for Video Technology, IEEE Transactions on, vol. 22, no. 12, pp. 1649, 1668, December 2012

[7] Ohm, J., Sullivan, G. J., Schwarz, H., Thiow Keng Tan, Wiegand, T., *Comparison of the Coding Efficiency of Video Coding Standards—Including High Efficiency Video Coding (HEVC)*, Circuits and Systems for Video Technology, IEEE Transactions on, vol. 22, no. 12, pp. 1669, 1684, December 2012

[8] Grois, D., Marpe, D., Mulayoff, A., ltzhaky, B., Hadar, O., *Performance comparison of H.265/MPEG-HEVC, VP9, and H.264/MPEG-AVC encoders*, Picture Coding Symposium (PCS), 2013, vol., no., pp. 394, 397, 8-11 Dec. 2013

[9] Grois, D., Marpe, D., Nguyen, T., Hadar, O., *Comparative assessment of H.265/MPEG-HEVC, VP9, and H.264/MPEG-AVC encoders for low-delay video applications*, Proc. SPIE 9217, Applications of Digital Image Processing XXXVII, Sep. 23, 2014

[10] Bross, B., George, V., Alvarez-Mesa, M., Mayer, T., Chi Ching Chi, Brandenburg, J., Schierl, T., Marpe, D., Juurlink, B., *HEVC performance and complexity for 4K video*, IEEE Third International Conference on Consumer Electronics, Berlin (ICCE-Berlin), 2013. vol., no., pp. 44, 47, 9-11 September 2013

[11] Choudhury, H. A., Saikia, M., *Survey on block matching algorithms for motion estimation*, Communications and Signal Processing (ICCSP), 2014 International Conference on, vol., no., pp. 036, 040, 3-5 Apr. 2014

[12] Ying Zhang, Wan-Chi Siu, Tingzhi Shen, *Fast sub-pixel motion estimation based on directional information and adaptive block classification*, Visual Information Engineering, 2008. VIE 2008. 5th International Conference on, vol., no., pp. 622, 627, Jul. 29, 2008-Aug. 1, 2008

[13] Nisar, H., Tae-Sun Choi, *Fast and efficient fractional pixel motion estimation for H.264/AVC video coding*, Image Processing (ICIP), 2009 16th IEEE International Conference on, vol., no., pp. 1561, 1564, 7-10 Nov. 2009

[14] Wei, Z., Fen, F., Xiaoyang, W., Weile, Z., *Directionality based fast fractional pel motion estimation for H.264*, Systems Engineering and Electronics, Journal of, vol. 20, no. 3, pp. 457, 462, June 2009

[15] Sotetsumoto, T., Tian Song, Shimamoto, T., *Low complexity algorithm for sub-pixel motion estimation of HEVC*, Signal Processing, Communication and Computing (ICSPCC), 2013 IEEE International Conference on, vol., no., pp. 1, 4, 5-8 Aug. 2013

[16] Suh, J. W., Jechang Jeong, *Fast sub-pixel motion estimation techniques having lower computational complexity*, Consumer Electronics, IEEE Transactions on, vol. 50, no. 3, pp. 968, 973, August 2004

[17] Weiyao Lin, Panusopone, K., Baylon, D. M., Ming-Ting Sun, Zhenzhong Chen, Hongxiang Li, *A Fast Sub-Pixel Motion Estimation Algorithm for H.264/AVC Video Coding*, Circuits and Systems for Video Technology, IEEE Transactions on, vol. 21, no. 2, pp. 237, 242, February 2011

[18] Marpe, D., Schwarz, H., Wegand, T., *Context-based adaptive binary arithmetic coding in the H.264/AVC video compression standard*, Circuits and Systems for Video Technology, IEEE Transactions on, vol. 13, no. 7, pp. 620, 636, July 2003

[19] Bjøntegard, G., *Calculation of average PSNR differences between RD-curves*, ITU-T VCEG-M33, 2001

[20] Bossen, F., *Common test conditions and software reference configurations*, Joint Collaborative Team on Video Coding (JCT-VC), JCTVCL1100, 2013

The invention claimed is:

1. An apparatus for refinement of a lower-pel resolution motion estimation vector, comprising
a higher-pel resolution vector ranker configured to determine a context out of a set of context candidates based on coding costs of a set of lower-pel resolution vectors within a neighborhood of the lower-pel resolution motion estimation vector, each context candidate being associated with a ranking among a set of higher-pel resolution candidate vectors surrounding the lower-pel resolution motion estimation vector; and
refiner configured to refine the lower-pel resolution motion estimation vector so as to acquire a higher-pel resolution motion estimation vector by
performing a sequential—according to the ranking associated with the context determined—testing of the set of higher-pel resolution candidate vectors whether a current higher-pel resolution candidate vector comprises a lower coding cost associated therewith than a coding cost of the lower-pel resolution motion estimation vector and a coding cost of any preceding higher-pel resolution candidate vector,
selecting the current higher-pel resolution candidate vector as the higher-pel resolution motion estimation vector if the current higher-pel resolution candidate vector comprises a lower coding cost associated therewith than a coding cost of the lower-pel resolution motion estimation vector and a coding cost of any preceding higher-pel resolution candidate vector; and
aborting the sequential testing according to a predetermined abort criterion,
wherein the higher-pel resolution vector ranker and the refiner are implemented on a microprocessor, a programmed computer or an electronic circuit.

2. The apparatus according to claim 1, wherein the coding costs of the set of lower-pel resolution vectors, the coding cost of the lower-pel resolution motion estimation vector, and the coding costs of the current and previous higher-pel resolution candidate vectors are a result of a cost function of bitrate and distortion.

3. The apparatus according to claim 1, wherein the higher-pel resolution vector ranker is configured such that the set of lower-pel resolution vectors comprises the lower-pel resolution motion estimation vector.

4. The apparatus according to claim 1, wherein the higher-pel resolution vector ranker is configured such that the set of lower-pel resolution vectors comprises eight lower-pel resolution vectors immediately neighboring the lower-pel resolution motion estimation vector.

5. The apparatus according to claim 1, wherein the higher-pel resolution vector ranker is configured such that the set of lower-pel resolution vectors comprises, exclusively, the lower-pel resolution motion estimation vector and eight lower-pel resolution vectors immediately neighboring the lower-pel resolution motion estimation vector.

6. The apparatus according to claim 1, wherein the higher-pel resolution vector ranker is configured to perform the determination of the context by
applying a vector-valued function onto the coding costs of the set of lower-pel resolution vectors to acquire a vector comprising a vector component per context candidate, and
determining the minimum vector component of the vector so that the context candidate associated with the minimum vector component becomes the context.

7. The apparatus according to claim 6,
wherein, for each context candidate, the respective vector component is a measure for a locally weighted average of the coding cost of the set of lower-pel resolution vectors, wherein a weighting centroid of the locally weighted average is spatially mutually separated for the vector components of the vector.

8. The apparatus according to claim 6, wherein the higher-pel resolution vector ranker is configured such that the cardinality of the set of context candidates is nine with the weighting centroids mutually differing in directional displacement relative to the lower-pel resolution motion estimation vector.

9. The apparatus according to claim 1, wherein the higher-pel resolution vector ranker is configured such that the set of context candidates comprises N context candidates and represents a nominally scaled measure of a direction into which the spatial distribution of coding costs of the set of lower-pel resolution vectors locally decreases at the lower-pel resolution motion estimation vector comprising no decrease and N−1 directional values.

10. The apparatus according to claim 1, wherein the refiner is configured so that the predetermined abort criterion depends on
a number of previously tested higher-pel resolution candidate vectors, and/or
an estimation for a coding cost gain associated with the current higher-pel resolution candidate vector; and/or
a maximum number of higher-pel resolution candidate vectors to be tested; and/or
a measure for a computational cost or an estimate for the computational cost of testing the current higher-pel resolution candidate vector.

11. The apparatus according to claim 1, wherein the refiner is configured so that the predetermined abort criterion depends on a measure for a computational cost or an estimate for the computational cost of testing the current higher-pel resolution candidate vector and wherein the refiner is configured to look-up the estimation for a coding cost gain using
the current higher-pel resolution candidate vector's displacement relative to the lower-pel resolution motion estimation vector and
the context determined.

12. The apparatus according to claim 1, wherein the refiner is configured to check the predetermined abort criterion prior to testing the current higher-pel resolution candidate vector.

13. The apparatus according to claim 1, wherein
the refiner is configured to so that the higher-pel resolution motion estimation vector becomes one of the set of the higher-pel resolution candidate vectors and the lower-pel resolution motion estimation vector, respectively,
each context candidate is, for each of the set of the higher-pel resolution candidate vectors and the lower-pel resolution motion estimation vector, also associated with a ranking among a set of even-higher-pel resolution candidate vectors surrounding the respective higher-pel resolution candidate vector and the lower-pel resolution motion estimation vector, respectively, and
the apparatus is configured to repeat the refinement for the higher-pel resolution motion estimation vector by
the refiner refining the higher-pel resolution motion estimation vector so as to acquire an even-higher-pel resolution motion estimation vector by performing a sequential—according to the ranking among the set of even-higher-pel resolution candidate vectors surrounding the higher-pel resolution motion estimation vector with which the context determined is associated—testing of the set of even-higher-pel resolution candidate vectors whether a current even-higher-pel resolution candidate vector comprises a lower coding cost associated therewith than a coding cost of the higher-pel resolution motion estimation vector and a coding cost of any preceding even-higher-pel resolution candidate vector, selecting the current even-higher-pel resolution candidate vector as the even-higher-pel resolution motion estimation vector if the current even-higher-pel resolution candidate vector comprises a lower coding cost associated therewith than a coding cost of the higher-pel resolution motion estimation vector and a coding cost of any preceding even-higher-pel resolution candidate vector; and aborting the sequential testing according to a predetermined abort criterion.

14. A video encoder supporting motion-estimated prediction comprising an apparatus for refinement of a lower-pel resolution motion estimation vector according to claim 1.

15. The video encoder according to claim 14 being a HEVC encoder.

16. A method for refinement of a lower-pel resolution motion estimation vector, comprising determining a context out of a set of context candidates based on coding costs of a set of lower-pel resolution vectors covering a neighborhood of the lower-pel resolution motion estimation vector, each context candidate being associated with a ranking among a set of higher-pel resolution candidate vectors surrounding the lower-pel resolution motion estimation vector; and refining the lower-pel resolution motion estimation vector so as to acquire a higher-pel resolution motion estimation vector by performing a sequential—according to the ranking of the context determined—testing of the set of higher-pel resolution candidate vectors whether a current higher-pel resolution candidate vector comprises a lower coding cost associated therewith than a coding cost of the lower-pel resolution motion estimation vector and a coding cost of any preceding higher-pel resolution candidate vector, selecting the current higher-pel resolution candidate vector as the higher-pel resolution motion estimation vector if the current higher-pel resolution candidate vector comprises a lower coding cost associated therewith than a coding cost of the lower-pel resolution motion estimation vector and a coding cost of any preceding higher-pel resolution candidate vector; and aborting the sequential testing according to a predetermined abort criterion.

17. A non-transitory digital storage medium having a computer program stored thereon to perform the method for refinement of a lower-pel resolution motion estimation vector, comprising determining a context out of a set of context candidates based on coding costs of a set of lower-pel resolution vectors covering a neighborhood of the lower-pel resolution motion estimation vector, each context candidate being associated with a ranking among a set of higher-pel resolution candidate vectors surrounding the lower-pel resolution motion estimation vector; and refining the lower-pel resolution motion estimation vector so as to acquire a higher-pel resolution motion estimation vector by performing a sequential—according to the ranking of the context determined—testing of the set of higher-pel resolution candidate vectors whether a current higher-pel resolution candidate vector comprises a lower coding cost associated therewith than a coding cost of the lower-pel resolution motion estimation vector and a coding cost of any preceding higher-pel resolution candidate vector, selecting the current higher-pel resolution candidate vector as the higher-pel resolution motion estimation vector if the current higher-pel resolution candidate vector comprises a lower coding cost associated therewith than a coding cost of the lower-pel resolution motion estimation vector and a coding cost of any preceding higher-pel resolution candidate vector; and aborting the sequential testing according to a predetermined abort criterion, when said computer program is run by a computer.

\* \* \* \* \*